(12) United States Patent  (10) Patent No.: US 7,966,630 B2
Hirata et al.  (45) Date of Patent: Jun. 21, 2011

(54) HEAD GIMBAL MECHANISM AND INFORMATION RECORDING/REPRODUCING APPARATUS

(75) Inventors: Masakazu Hirata, Symbiosis (SG); Manabu Oumi, Chiba (JP); Majung Park, Chiba (JP)

(73) Assignee: Seiko Instruments Inc. (JP)

( * ) Notice: Subject to any disclaimer, the term of this patent is extended or adjusted under 35 U.S.C. 154(b) by 269 days.

(21) Appl. No.: 12/309,654

(22) PCT Filed: Jul. 20, 2007

(86) PCT No.: PCT/JP2007/064305
§ 371 (c)(1),
(2), (4) Date: Mar. 13, 2009

(87) PCT Pub. No.: WO2008/013101
PCT Pub. Date: Jan. 31, 2008

(65) Prior Publication Data
US 2009/0323223 A1  Dec. 31, 2009

(30) Foreign Application Priority Data
Jul. 27, 2006 (JP) ................... 2006-204354

(51) Int. Cl.
*G11B 7/135* (2006.01)
*G11B 5/00* (2006.01)
*G11B 5/147* (2006.01)

(52) U.S. Cl. .............. 720/659; 369/300; 360/234.3
(58) Field of Classification Search .......... 369/300, 369/112.29, 13.02, 112.23, 112.27, 13.05, 369/112.24, 112.04, 112.07; 360/234.3; 720/659, 672, 681, 682
See application file for complete search history.

(56) References Cited

U.S. PATENT DOCUMENTS 7,061,727 B2 * 6/2006 Hoshino et al. ............. 360/320
2005/0285526 A1 * 12/2005 Moon et al. ................. 313/582

* cited by examiner

*Primary Examiner* — Allen T Cao
(74) *Attorney, Agent, or Firm* — Adams & Wilks (57) ABSTRACT

There is provided a head gimbal mechanism 2 including a slider 10 placed between a recording medium D and a beam 11 and having a device generating near-field light, gimbal means 12 for fixing the slider to the tip of the beam 11 at a state that it can rotate about two axes which are parallel to the surface of the recording medium and are orthogonal to each other, and a flexible optical waveguide 13 composed of a basic waveguide section 21 placed along the beam and a bent waveguide section 21 that is bent in the Z-direction substantially orthogonal to the surface of the recording medium from the tip of the basic waveguide and connecting to the slider in non-contact with the beam and the gimbal means, the optical waveguide 13 guiding the luminous flux to the slider, wherein the basic waveguide section is placed at a state that at least a predetermined length on the bent waveguide section side relative to the beam is not fixed to the beam.

6 Claims, 6 Drawing Sheets

HEAD GIMBAL MECHANISM AND INFORMATION RECORDING/REPRODUCING APPARATUS

CROSS-REFERENCE TO RELATED APPLICATION

This application is a U.S. national stage application of International Application No. PCT/JP2007/064305, filed Jul. 20, 2007, claiming a priority date of Jul. 27, 2006, and published in a non-English language.

TECHNICAL FIELD

The present invention relates to a head gimbal mechanism that has a near-field optical head having a near-field light emitting device for generating near-field light at the tip and performing information recording/reproduction at a higher density and an information recording/reproducing apparatus having the head gimbal mechanism.

BACKGROUND ART

In recent years, with the increase in capacities in hard disks in computer equipment, the densities for recording information in a single recording layer are increasing. For example, in order to increase the recording capacity for each unit area of a magnetic disk, the areal density must be increased. However, as the areal density increases, the recording area occupied by each one bit decreases on a recording medium. In a decreased bit size, the energy that information of one bit has becomes closer to thermal energy at ambient temperature, which causes a problem of heat demagnetization including that recorded information thereon may be inverted or be lost due to heat fluctuation, for example.

The longitudinal magnetic recording, which has been used in general, is a method for recording magnetism such that the direction of magnetization can be the longitudinal direction of a recording medium. In this method, the loss of recorded information may be easily caused by the heat demagnetization. Accordingly, in order to solve the problem, a shift is on its way to perpendicular recording that records a magnetization signal in a perpendicular direction to a recording medium. This method is a method that records magnetization information on a recording medium on the principle that a magnetic monopole is brought close thereto. With this method, the recorded magnetic field points substantially in the perpendicular direction to a recording film. The information recorded with a perpendicular magnetic field can easily keep the stability in energy because producing a loop by the N-pole and the S-pole is difficult within a recording layer. Therefore, the perpendicular recording is more resistant to heat demagnetization than longitudinal recording.

However, recent recording media have been demanded further increases in density in response to the need for recording/reproduction of a large amount of information at a high density, for example. For that reason, highly coercive recording media have been started to be adopted in order to minimize the influences between adjacent magnetic domains and/or the heat fluctuation. Therefore, it has become difficult even for the perpendicular recording to record information on recording media.

Accordingly, in order to solve the problem, hybrid magnetic recording has been proposed that locally heats a magnetic domain with near-field light to reduce the coercivity temporarily and performs writing thereon during the period. The hybrid magnetic recording is a method that uses near-field light generated by the interaction between an infinitesimal area and an optical aperture in a size equal to or smaller than the wavelength of the light formed in a near-field optical head. In this way, by using a near-field optical head having a minute optical aperture beyond the diffraction limit of light, that is, a near-field light emitting device, optical information in an area equal to or smaller than the wavelength of light, which has been considered as the limit with conventional optical systems, can be handled. This may facilitate the increase in density of recording bits beyond conventional optical information recording/reproducing apparatus and so on.

Notably, the near-field light emitting device may have a projection in a nanometer size, for example, instead of the optical minute aperture. Also with the projection, near-field light can be generated as from the optical minute aperture.

As one of proposed various information recording/reproducing apparatus based on the hybrid magnetic recording, an information recording/reproducing apparatus is known (Publication 1 of unexamined application: International Publication WO 00/28536) that generates a sufficiently large quantity of near-field light from a minute aperture by supplying light for generating near-field light to a near-field optical head, whereby ultrahigh-resolution reproduction/recording, high-speed recording/reproduction and a high SN ratio can be sought.

Figure 13:
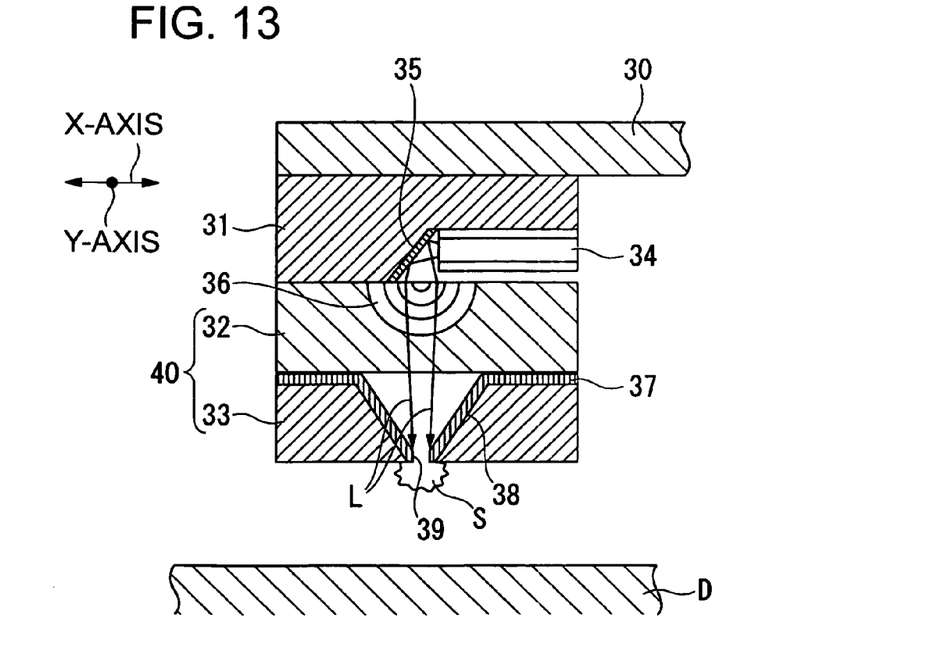
FIG. 13 is a diagram showing an example of a conventional slider.

The information recording/reproducing apparatus includes, as shown in FIG. 13, a gimbal 30 provided at a pointed end of an arm, not shown, a first substrate 31 fixed to the gimbal 30 rotatably about an X-axis and a Y-axis, a second substrate 32 fixed to the bottom surface of the first substrate 31, and a third substrate 33 fixed to the bottom surface of the second substrate 32.

The first substrate 31 has a V-groove, and an optical waveguide 34 that guides laser light L into the V-groove is placed therefor. The laser light L emitted from the tip of the optical waveguide 34 is configured to be reflected by an optical reflective layer 35 on the first substrate 31 and enter to the second substrate 32.

The second substrate 32 has a lens 36 that condenses the laser light L reflected by the optical reflective layer 35 to a minute aperture 39, which will be described later, of the third substrate 33. The third substrate 33 has a tapered through-hole 38 on which a light reflective film 37 is deposited, and the center of the through-hole 38 is the minute aperture 39. Then, near-field light S is generated by the laser light L condensed to the minute aperture 39. The bottom surface of the third substrate 33 has a slider surface (ABS: Air Bearing Surface) 33a facing a rotating disk D and is designed to levitate by receiving the air flow with the rotation of the disk D.

A slider 40 is composed of the second substrate 32 and third substrate 33.

In a case where information is to be written on the disk D by the information recording/reproducing apparatus having the configuration above, the arm is moved to scan by a voice coil motor, for example, after the disk D is rotated first, and then the slider 40 is moved to a desired position on the disk D. At that time, the slider 40 has a state that it is levitating at a predetermined height from the disk D because it receives the levitation force by the third substrate 33. Because the slider 40 is fixed to the arm through the gimbal 30, it can rotate about an X-axis and a Y-axis in connection with the undulation of the disk D that is rotating at a high speed, and the levitating attitude can be stable. Thus, the distance between the minute aperture 39 and the disk D can be kept constant.

Next, the laser light L is launched to the optical waveguide 34. The launched laser light L propagates within the optical waveguide 34 and is guided to the tip. The laser light L emitted from the tip of the optical waveguide 34 is reflected by the optical reflective layer 35 and then enters to the second substrate 32. The laser light L incident on the second substrate 32 is condensed by the lens 36 and is guided to the minute aperture 39. Thus, the near-field light S occurs near the minute aperture 39. The disk D is locally heated by the near-field light S, and the coercivity decreases temporarily. As a result, information can be written on the disk D.

Publication 1: International Publication WO 00/28536

DISCLOSURE OF THE INVENTION

Problems to be Solved by the Invention

However, the conventional information recording/reproducing apparatus disclosed in Publication 1 still has problems below.

That is, because it has a structure in which three layers of the first substrate 31, the second substrate 32 and the third substrate 33 are superposed, the distance between the center of rotation of the gimbal 30 and the slider surface 33a is long. Therefore, it is difficult to effectively realize further stable levitation of the slider 40 by designing any improvement of the slider surface 33a.

The optical waveguide 34 is placed in parallel to the slider surface 33a and linearly. Therefore, in a case where the slider 40 rotates about the Y-axis and the attitude changes, a stress (compressive force or tencile force) occurs in the longitudinal direction in which it is difficult for the optical waveguide 34 to deform easily. Therefore, the optical waveguide 34 is stretched. This point can also be a factor responsible for the prevention of further stable levitation of the slider 40.

The invention was made in consideration of the matters, and it is an object of the invention to provide a head gimbal mechanism that allows information recording/reproduction at a higher density and accurately by levitating a slider in a more stable manner and allows enhancement of the scanning performance by performing stable and high-speed scanning and an information recording/reproducing apparatus having the head gimbal mechanism.

Means for Solving the Problem

In order to solve the problem, the invention provides following means.

A head gimbal mechanism of the present invention is a head gimbal mechanism causing information to be recorded/reproduced to/from the recording medium by using near-field light, the head gimbal mechanism characterized by including a beam that has a planer shape and is movable in a parallel direction to a surface of the recoding medium, a slider placed between the recording medium and the beam and having an optical system condensing a guided luminous flux, a near-field light emitting device generating the near-field light from the condensed luminous flux and an air bearing surface facing the surface of the recording medium, gimbal means for fixing the slider to the bottom surface of the beam at a state that it can rotate about two axes which are parallel to the surface of the recording medium and are orthogonal to each other, and a flexible optical waveguide composed of a basic waveguide section placed from the base end side to the tip side of the beam along the beam and a bent waveguide section that is bent in the direction substantially orthogonal to the surface of the recording medium from the tip of the basic waveguide and connecting to the slider in non-contact with the beam and the gimbal means, the optical waveguide guiding the luminous flux to the slider, wherein the basic waveguide section is placed at a state that at least a predetermined length on the bent waveguide section side relative to the beam is not fixed to the beam.

In the head gimbal mechanism according to the invention, the beam is first moved in the parallel direction to the surface of a recording medium such as an optical disk to scan the rotating recording medium. Thus, the slider is moved to a desired position on the recording medium. Next, a luminous flux is guided to the slider through the optical waveguide. In other words, the luminous flux is guided by the basic waveguide section from the base end side to the tip side of the beam, and the luminous flux is guided to the slider by the bent waveguide section. Then, the luminous flux guided by the slider is condensed by the optical system. Thus, near field light occurs from the condensed luminous flux by the near-field light emitting device. Notably, the near-field light emitting device may be composed of an optical minute aperture or a projection in a nanometer size, for example.

The recording medium is locally heated by the near field light, and the coercivity decreases temporarily. As a result, the slider can be used to record/reproduce information to/from the recording medium.

Here, the slider is supported by the bottom surface of the beam and is held down to the recording medium side by a predetermined force. At the same time, the slider receives a levitating force by receiving the influence of the air pressure generated by the rotating recording medium because the air bearing surface faces the recording medium. The balance between both of the forces levitates the slider at a position away from the recording medium.

The slider is caused by the gimbal means to have a state that it can rotate about two axes which are parallel to the surface of a recording medium and are orthogonal to each other, that is, to twist about the two axes. Thus, even when the recording medium is undulated, the change in air pressure due to the undulation (change to the direction that is orthogonal to the surface of the recording medium) can be absorbed by the twist, and the attitude of the levitating slider can be stabilized.

In particular, the slider has a different structure from those of the conventional ones and is fixed to the beam through the gimbal means without across the optical waveguide. Thus, the distance between the center position of the rotation by the gimbal means and the air bearing surface of the slider can be extremely minimized. Therefore, the slider can be levitated in a more stable manner, and the levitating attitude is stabilized.

The optical waveguide connects to the slider at the bent waveguide section bending in the direction that is substantially orthogonal to the surface of the recording medium after being placed to the tip of the beam at the basic waveguide section. In this case, because the bent waveguide section connects to the slider in non-contact with the beam and gimbal means, the bent waveguide section can move by following the movement of the slider without the interferences by the beam and gimbal means. On the other hand, the area in a predetermined length on the bent waveguide section side of the basic waveguide section placed along the beam is not fixed to and is in non-contact with the beam. For that reason, in a case where the slider rotates about the axis that is orthogonal to the longitudinal direction of the beam by receiving the air pressure from the recording medium, the bent waveguide section moves in the direction that is orthogonal to the surface of the recording medium by following the movement of the slider, and the basic waveguide section is influenced by the bent waveguide section to bend and deform vertically.

In other words, even when the slider rotates about the axis that is orthogonal to the longitudinal direction of the beam, the bending stress only acts on the basic waveguide section because the bent waveguide section positions at the tip of the basic waveguide section. On the other hand, in conventional ones, the stress (compressive force or tencile force) in the longitudinal direction that is difficult to deform it easily acts thereon when the slider rotates in the same direction. Here, the elastic modulus in the direction of bending is smaller than the elastic modulus in the longitudinal direction. Thus, unlike conventional ones, the interference with the movement of the slider by the optical waveguide can be prevented, and it is difficult to have an influence on gimbal operations. Therefore, also from this point of view, the slider can be levitated in a more stable manner, and the levitating attitude can be stabilized.

In a case where the slider rotates about an axis that is parallel to the longitudinal direction R of the beam, it is difficult to influence on the gimbal operations only with the twist of the basic waveguide section.

As a result of them, the control over the levitation and the levitating attitude can be more stabilized than conventional ones, and information can be recorded/reproduced more accurately. Because the attitude of the levitating slider is stable, the amount of levitation can be minimized as much as possible by bringing the slider closer to the recording medium more than conventional ones. Thus, information can be recorded at a higher density than conventional ones.

Furthermore, because the slider can be brought extremely closer to the gimbal means, the distance between the center of the rotation by the gimbal means and the center of gravity of the slider can be shorter than conventional ones. Therefore, a moment of rotation is difficult to occur when the beam is scanned. As a result, high-speed scanning can be performed, and the scanning performance can be enhanced.

The head gimbal mechanism of the invention according to the aforesaid head gimbal mechanism of the invention is characterized in that the basic waveguide section is placed on the top surface of the beam so as to face the slider across the beam, and the area excluding that of the predetermined length is fixed to the beam, and a space is provided in advance between the beam in the area of the predetermined length and the basic waveguide section.

In the head gimbal mechanism according to the invention, because the basic waveguide section is placed on the top surface of the beam, the basic waveguide section can bend like inflating without any interference even when the bent waveguide section moves in the direction away from a recording medium by following the movement of the slider. Furthermore, because a space is provided between the beam and the basic waveguide section, the basic waveguide section can bend without interfering with the beam even when the bent waveguide section moves in the direction closer to a recording medium by following the movement of the slider.

In this way, because the degree of freedom of the basic waveguide section can be increased, the influence on the gimbal operations can be further eliminated. Therefore, the stability of the slider can be further enhanced.

The head gimbal mechanism according to the aforesaid head gimbal mechanism of the invention is characterized in that the basic waveguide section is formed such that the section area along the surface that is orthogonal to the longitudinal direction of the beam can be smaller than section areas at other positions on the tip side of the beam.

In the head gimbal mechanism according to the invention, the basic waveguide section is formed such that the section area can be smaller than section areas at other positions on the tip side of the beam, that is, the width can be narrower than those at other positions. Thus, the tip side of the basic waveguide section can be more easily bend. Therefore, the influence on the gimbal operations can be further reduced. As a result, the stability of the levitating slider can be further increased.

The head gimbal mechanism of the invention according to any one of the aforesaid head gimbal mechanisms of the invention is characterized in that the basic waveguide section is formed so as to have a substantially equal width as that of the beam on the base end side of the beam.

In the head gimbal mechanism according to the invention, since the basic waveguide section is formed so as to have a substantially equal width as that of the beam on the base end side of the beam, the area of contact between the basic waveguide section and the beam can be increased. Therefore, because the optical waveguide can be securely positioned and fixed to the beam in a stable manner, the misregistration of the optical waveguide can be prevented, for example. As a result, the long-term reliability can be provided.

The head gimbal mechanism of the invention according to any one of the aforesaid head gimbal mechanisms of the invention is characterized in that the basic waveguide section and the bent waveguide section are both formed from a clad, a core that contains a material having a different index of refraction from that of the clad and guides the luminous flux under a total reflection condition is provided within the basic waveguide section, and a mirror that reflects the luminous flux guided by the core toward the optical system through the bent waveguide section is provided between the basic waveguide section and the bent waveguide section.

In the head gimbal mechanism according to the invention, in order to guide a luminous flux to the slider, the luminous flux is first launched to the core provided within the basic waveguide section. Then, the luminous flux travels within the core toward the tip side of the basic waveguide section by repeating the total reflection at the interface between the core and the clad due to the difference in index of refraction. The luminous flux traveled to the tip of the waveguide section is reflected by the mirror, and the angle changes. Then, because the total reflection condition is not satisfied at the time of the reflection, the luminous flux travels toward the bent waveguide section side across the core. However, because the bent waveguide section is composed of the clad only, the luminous flux travels within the bent waveguide section toward the slider by gradually diffusing. Thus, the luminous flux at a state of diffused light in a certain extent can be guided to the optical system.

Hence, the angle of condensation (point-ahead angle) in condensing the luminous flux to the near-field light emitting device through the optical system can be a high value as much as possible. In other words, the luminous flux can be condensed at a steeper angle. Therefore, the NA can be increased. As a result, the near field light can be generated more efficiently, and the performance of recording/reproduction can be enhanced, which can provide higher quality.

The head gimbal mechanism of the invention according to the aforesaid head gimbal mechanism of the invention is characterized in that the core is positionally adjusted such that a predetermined space can be provided between its tip and the mirror.

In the head gimbal mechanism according to the invention, the core positionally adjusted such that a predetermined space can be provided between the tip of the core and the mirror is provided within the basic waveguide section. Thus, the luminous flux guided by the core can reach the mirror after exiting from the tip of the core once. The luminous flux reflected by the mirror diffuses and travels toward the bent waveguide section side without across the core and enters to the optical system of the slider.

In this way, because a space is provided between the tip of the core and the mirror, the luminous flux reflected by the mirror does not cross over the core. Therefore, the reflected luminous flux is not refracted by the core. As a result, the luminous flux having a larger extent can be guided to the optical system, and the NA can be increased.

A head gimbal mechanism is characterized by including the head gimbal mechanism according to any one of the head gimbal mechanisms of the invention, a light source that causes the luminous flux to enter from the base end side of the optical waveguide to the optical waveguide, an actuator that supports the base end side of the beam and moves the beam in the parallel direction to the surface of the recording medium, and a rotation driving unit that rotates the recording medium in a predetermined direction.

In the information recording/reproducing apparatus according to the invention, the beam is moved by the actuator to scan the slider after the recording medium is rotated by the rotation driving unit. Then, the slider is placed at a desired position on the recording medium. After that, the luminous flux is launched from the light source into the optical waveguide. Thus, information can be recorded/reproduced to/from the recording medium by using the slider of the head gimbal mechanism.

In particular, because it includes the head gimbal mechanism that can levitate the slider in a more stable manner and minimize the amount of levitation as much as possible, information recording/reproduction can be performed accurately and at a higher density, which can provide higher quality. Furthermore, because the head gimbal mechanism also has an enhanced scanning performance, the throughput can be enhanced.

BRIEF DESCRIPTION OF THE DRAWINGS

FIG. 10(*a*) is a section view taken along the arrow B-B shown in FIG. 9, and (*b*) is a section view taken along the arrow C-C shown in FIG. 9.

BEST MODE FOR CARRYING OUT THE INVENTION

An embodiment of the head gimbal mechanism and information recording/reproducing apparatus according to the invention will be described with reference to FIGS. 1 to 7.

Figure 1:
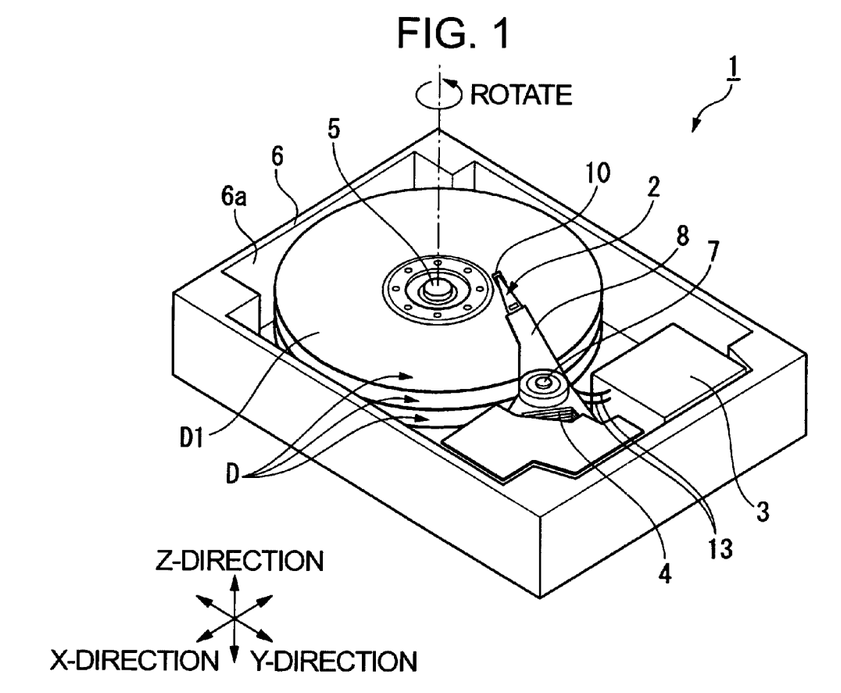
FIG. 1 is a configuration diagram of an embodiment of an information recording/reproducing apparatus having a head gimbal mechanism according to the present invention.

An information recording/reproducing apparatus 1 of this embodiment is an apparatus that records/reproduces information to/from a disk D (recording medium) by using near-field light S. As shown in FIG. 1, the information recording/reproducing apparatus 1 includes a head gimbal mechanism 2, an optical signal controller (light source) 3 that causes a luminous flux L to enter from the base end side of a optical waveguide 13 of the head gimbal mechanism 2 to the optical waveguide 13, an actuator 4 that supports the base end side of a beam 11 of the head gimbal mechanism 2 and causes the beam 11 to move to scan in an XY direction that is parallel to a disk surface D1 (the surface of a disk D), a spindle motor (rotation driving unit) 5 that rotates the disk D in a predetermined direction, and a housing 6 that internally accommodates these components.

The housing 6 is formed in a square shape at a plane view by a metallic material such as aluminum and has a concave 6*a* that internally accommodates the components. A lid, not shown, is removably fixed to the housing 6 so as to block the aperture of the concave 6*a*. The spindle motor 5 is attached to the substantial center of the concave 6*a*, and a disk D is removably fixed with the center hole fitted into the spindle motor 5. The actuator 4 is attached to a corner of the concave 6*a*. A carriage 8 is attached to the actuator 4 through a bearing 7. The head gimbal mechanism 2 is attached to the tip of the carriage 8. Then, the carriage 8 and head gimbal mechanism 2 can be driven by the actuator 4 to move in the XY direction.

The carriage 8 and head gimbal mechanism 2 are driven by the actuator 4 to avoid from the disk D when the disk D stops rotating. The optical signal controller 3 is attached within the concave 6*a* adjacently to the actuator 4.

The head gimbal mechanism 2 causes a slider 10 that is a near-field optical head having a near-field light emitting device, not shown, to generate near field light S by guiding a luminous flux L from the optical signal controller 3 and records/reproduces information to/from the disk D by using the near field light S. Notably, the near-field light emitting device may be composed of an optical minute aperture or a projection in a nanometer size, for example.

Figure 2:
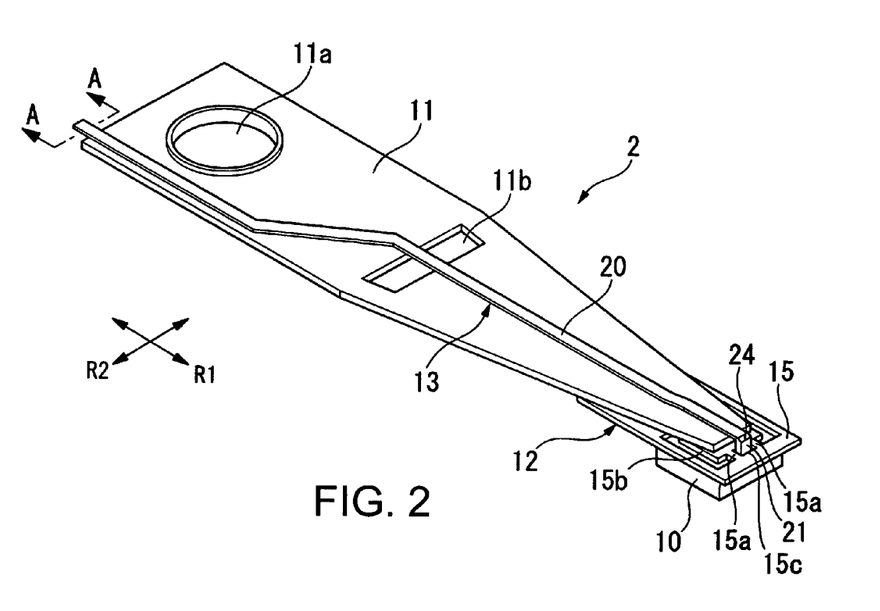
FIG. 2 is a perspective view of the gimbal mechanism shown in FIG. 1.
Figure 3:
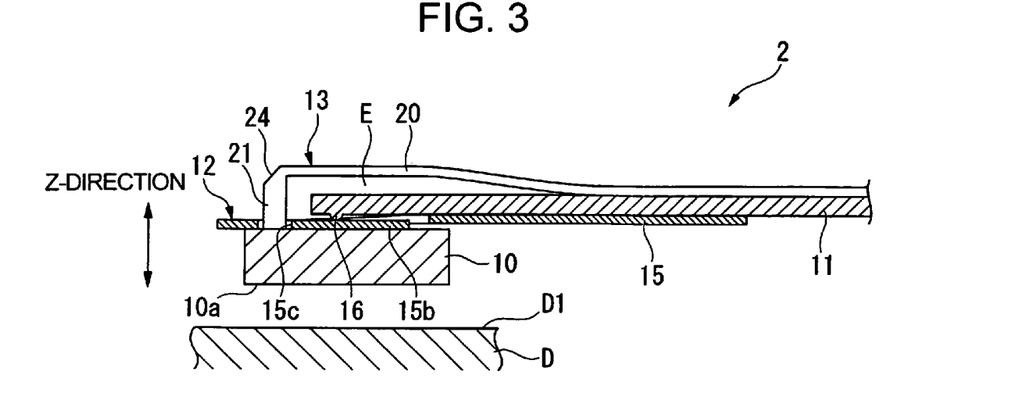
FIG. 3 is an enlarged section view of a distal side of the gimbal mechanism shown in FIG. 2.
Figure 4:
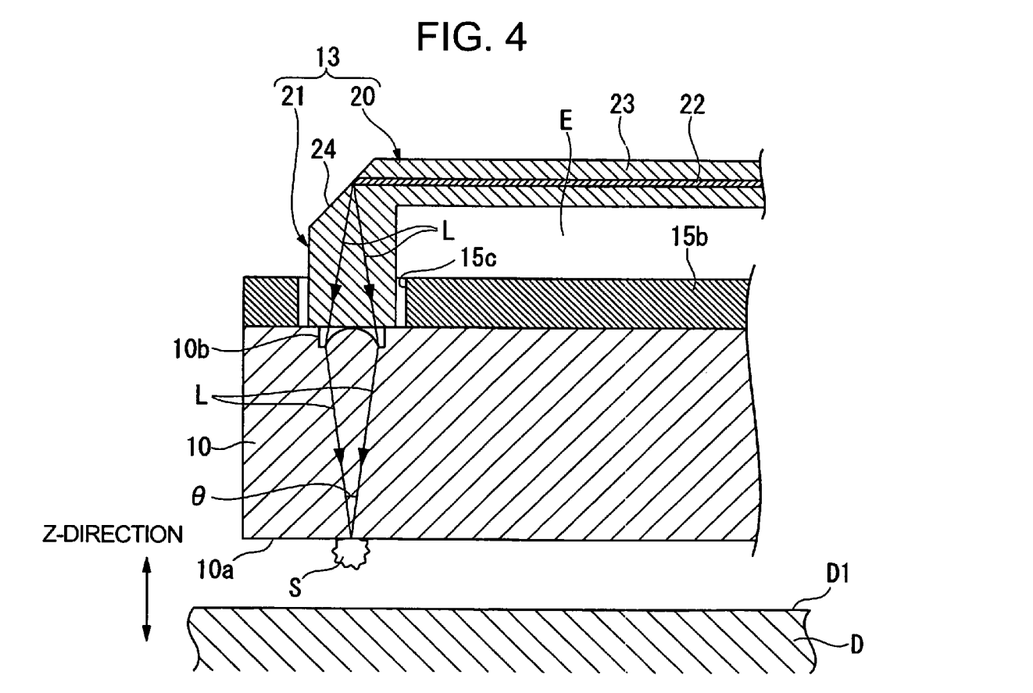
FIG. 4 is a section view for explaining an optical connection between an optical waveguide and slider composing the head gimbal mechanism shown in FIG. 2.

The head gimbal mechanism 2 of this embodiment includes, as shown in FIGS. 2 to 4, the slider 10, the beam 11 that is formed in a thin-plate shape from a metallic material and can move in an XY direction that is parallel to the disk surface D1, gimbal means 12 for fixing the slider 10 to the bottom surface of the beam 11 so as to have a state that it can rotate about two axes (X-axis and Y-axis) which are parallel to the disk surface D1 and are orthogonal to each other, that is, so as to twist about the two axes, and the flexible optical waveguide 13 that guides a luminous flux L from the optical signal controller 3 to the slider 10. Notably, the beam 11 and gimbal means 12 function as a suspension that levitates the slider 10 from the disk D.

The slider 10 includes, as shown in FIGS. 3 and 4, a condenser lens (optical system) 10*b* that is placed between the disk D and the beam 11 and is supported on the bottom surface of the beam 11 under the state and internally condenses a luminous flux L guided by the optical waveguide 13 and the near-field light emitting device that generates near field light S from the luminous flux L condensed by the condenser lens 10b. The bottom surface of the slider 10 is an air bearing surface 10a facing the disk surface D1. The air bearing surface 10a is a surface that generates pressure for levitating with the viscosity of the airflow caused by the rotating disk D and is called ABS (Air Bearing Surface). More specifically, it is designed to levitate the slider 10 at an optimum state by adjusting the positive pressure that attempts to isolate the slider 10 from the disk surface D1 and the negative pressure that attempts to attract the slider 10 to the disk surface D1.

The slider 10 receives a force to levitate from the disk surface D1 from the air bearing surface 10a and receives a force to hold down to the disk D side from the beam 11. Then, the slider 10 levitates from the disk surface D1 with the balance between both of the forces.

The beam 11 is formed by a thin metallic material such as stainless and, as shown in FIG. 2, has a square shape at a plane view from the base end to a middle position and is tapered from the middle position to the tip. The base end side of the beam 11 has an aperture 11a and is fixed to the tip of the carriage 8 through the aperture 11a.

The beam 11 further has an aperture 11b extending in the lateral direction R2 that is orthogonal to the longitudinal direction R1 at a middle position (which is the boundary position where the square shape at a plane view is switched to the tapered shape) between the distal end and the proximal end. Thus, the section area along the lateral direction R2 is smaller than the section area of the other part. Therefore, the beam 11 can bend about the middle position and easily bends in the Z-direction which is perpendicular to the disk surface D1.

Figure 5:
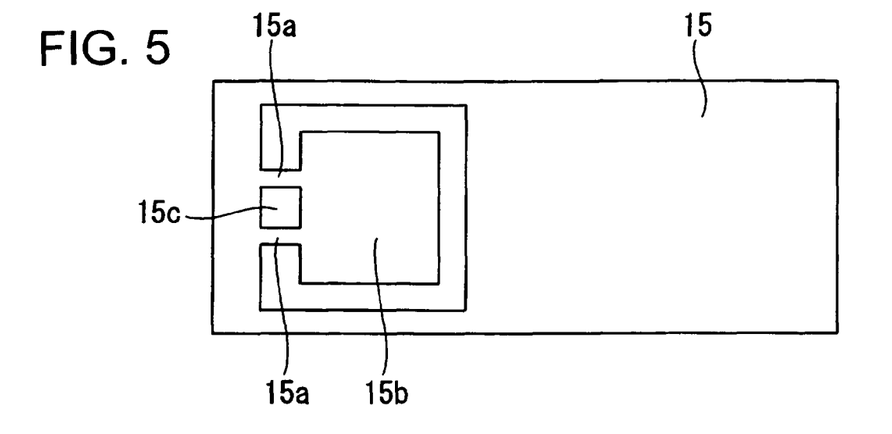
FIG. 5 is a top surface view of the gimbal composing the head gimbal mechanism shown in FIG. 2.

A sheet-shaped gimbal 15 formed from a metallic material such as aluminum and having a square shaped external form at a plane view is attached to the bottom surface side of the beam 11, as shown in FIGS. 2, 3 and 5. The gimbal 15 is formed to warp downward slightly from the vicinity of the middle position to the tip. The gimbal 15 is fixed to the beam 11 from the base end side to the vicinity of the substantially middle position to prevent the contact of the warped tip side with the beam 11.

The tip side of the levitating gimbal 15 has a pad section 15b formed by hollowing around it in an inverted-C shape and is supported by a connecting section 15a in a cantilever manner. The pad section 15b can only be adjusted in angle to be parallel to the bottom surface of the beam 11. Then, the slider 10 is mounted and fixed onto the pad section 15b. In other words, the slider 10 is hanging on the beam 11 through the pad section 15b. The connecting section 15a has an aperture 15c through which a bent waveguide section 21, which will be described later, of the optical waveguide 13 extends.

The tip of the beam 11 has a projection 16 projecting toward the substantial centers of the pad section 15b and slider 10. The tip of the projection 16 is round. The projection 16 is brought into point-contact with the surface of the pad section 15b when the slider 10 levitates toward the beam 11 with air pressure received from the disk D. The levitating force is transferred from the projection 16 to the beam 11 and acts to bend the beam 11. Due to the undulation of the disk D, for example, when air pressure in the XY direction is applied to the slider 10, the slider 10 and pad section 15b are configured to twist about two axes of the X-axis and Y-axis, relative to the projection 16. Thus, the displacement in the Z-direction due to the undulation of the disk D (which is the displacement in the direction that is substantially orthogonal to the disk surface D1) can be absorbed, and the attitude of the slider 10 can be stabilized.

In other words, the projection 16 and gimbal 15 having the pad section 15b compose the gimbal means 12.

The optical waveguide 13 is composed of, as shown in FIGS. 2 to 4, a basic waveguide section 20 placed from the base end side to the tip side of the beam 11 along the beam 11 and the bent waveguide section 21 that is bent from the tip of the waveguide section 20 in the Z-direction that is substantially orthogonal to the disk surface D1 and connects to the slider 10 in non-contact with the beam 11 and gimbal means 12.

The basic waveguide section 20 is placed on the top surface of the beam 11 so as to face the slider 10 across the beam 11, and the basic waveguide section 20, positionally adjusted such that an area in a predetermined length on the bent waveguide section 21 side can be isolated from the top surface of the beam 11, is bonded to the top surface of the beam 11 under a state that. Thus, at least the area in the predetermined length on the bent waveguide section 21 side of the basic waveguide section 20 is not fixed to the beam 11. A space E is provided in advance between the basic waveguide section 20 and the beam 11 in the part.

The basic waveguide section 20 may be placed from the base end side to the tip side through any route on the top surface of the beam 11. The base end side of the basic waveguide section 20 connects to the optical signal controller 3 shown in FIG. 1 after passing through the carriage 8 and so on.

The bent waveguide section 21 connects to the slider 10 at a position facing the condenser lens 10b after passing through the aperture 11b of the connecting section 15a of the gimbal 15. Thus, the bent waveguide section 21 is in non-contact with the beam 11 and gimbal means 12.

Figure 6:
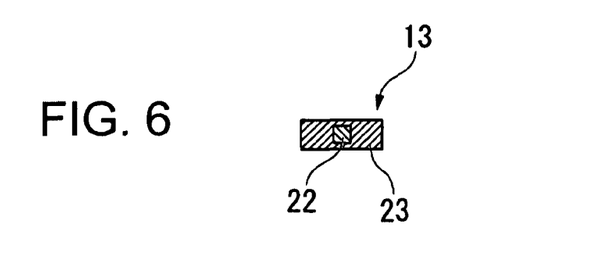
FIG. 6 is a section view along the arrow A-A shown in FIG. 2.

By the way, the optical waveguide 13 includes a core 22 and a clad 23 having mutually different indices of refraction, as shown in FIGS. 4 and 6. More specifically, the basic waveguide section 20 and the bent waveguide section 21 are formed from the clad 23. Then, the core 22 that guides a luminous flux L under a total reflection condition based on the difference in index of refraction is provided only within the basic waveguide section 20. The core 22 is placed such that the tip can be in contact with a mirror 24 that is provided between the basic waveguide section 20 and the bent waveguide section 21 and reflects a luminous flux L guided by the core 22 toward the condenser lens 10b of the slider 10 through the bent waveguide section 21.

Next, a case where information is to be recorded/reproduced to/from a disk D by the information recording/reproducing apparatus 1 configured as described above will be described below.

First of all, the spindle motor 5 is driven to rotate a disk D in a predetermined direction. Next, the actuator 4 is operated to cause the head gimbal mechanism 2 to scan in the XY direction through the carriage 8. Thus, the slider 10 can be positioned at a desired position on the disk D. Next, the luminous flux L is launched from the optical signal controller 3 to the optical waveguide 13, and the luminous flux L is guided to the slider 10. In other words, the luminous flux L is guided by the basic waveguide section 20 from the base end side to the tip side of the beam 11, and the luminous flux L is guided to the slider 10 by the bent waveguide section 21. Then, the luminous flux L guided by the slider 10 is condensed by the condenser lens 10b. Thus, near field light S occurs like exuding in the circumference of the near-field light emitting device.

The disk D is locally heated by the near field light S, and the coercivity decreases temporarily. As a result, the slider 10 can be used to record/reproduce information to/from the disk D.

Here, the slider 10 is supported by the beam 11 and is held down to the disk D side by a predetermined force. At the same time, the slider 10 receives a levitating force by receiving the influence of the air pressure generated by the rotating disk D because the air bearing surface 10a faces the disk D. The balance between both of the forces levitates the slider 10 at a position away from the disk D.

At that time, because the slider 10 is pushed toward the beam 11 side by receiving the air pressure, the pad section 15b of the gimbal 15 fixing the slider 10 and the projection 16 of the beam 11 are brought into point contact. Then, the levitating force is transferred to the beam 11 through the projection 16 and acts such that the beam 11 can be bent in the Z-direction that is perpendicular to the disk surface D1. Thus, the slider 10 levitates as described above. Notably, because the beam 11 has the aperture 11b substantially at the middle position, the beam 11 easily bends about the aperture 11b.

Even by receiving the air pressure (air pressure in the XY direction) generated due to the undulation of the disk D, the slider 10 is configured to twist about the X and Y axes through the gimbal means 12, that is, the pad section 15b in point contact with the tip of the projection 16. Therefore, the displacement in the Z-direction due to the undulation can be absorbed, and the attitude of the levitating slider 10 is stabilized.

In particular, the slider 10 of this embodiment has a different structure from those of the conventional ones and is fixed to the beam 11 through the gimbal means 12 without across the optical waveguide 13. Thus, the distance between the center position of the rotation by the gimbal means 12, that is, the position of the projection 16 and the air bearing surface 10a of the slider 10 can be extremely minimized. Therefore, the slider 10 can be levitated in a more stable manner, and the levitating attitude is stabilized.

The optical waveguide 13 connects to the slider 10 at the bent waveguide section 21 bending in the Z-direction that is substantially orthogonal to the disk surface D1 after being placed to the tip of the beam 11 at the basic waveguide section 20. In this case, because the bent waveguide section 21 connects to the slider 10 in non-contact with the beam 11 and gimbal means 12, the bent waveguide section 21 can move by following the movement of the slider 10 without the interferences by the beam 11 and gimbal means 12. On the other hand, the area in a predetermined length on the bent waveguide section 21 side of the basic waveguide section 20 placed on the top surface of the beam 11 is not fixed to and is in non-contact with the beam 11 through the space E.

For that reason, in a case where the slider 10 rotates about the axis that is orthogonal to the longitudinal direction R1 of the beam 11 by receiving the air pressure from the disk D, the bent waveguide section 21 moves in the Z-direction that is orthogonal to the disk surface D1 by following the movement of the slider 10, and the basic waveguide section 20 is influenced by the bent waveguide section 21 to bend and deform vertically.

In other words, even when the slider 10 rotates about the axis that is orthogonal to the longitudinal direction R1 of the beam 11, the bending stress only acts on the basic waveguide section 20 because the bent waveguide section 21 positions at the tip of the basic waveguide section 20. On the other hand, in conventional ones, the stress (compressive force or tencile force) in the longitudinal direction R1 that is difficult to deform it easily acts thereon when the slider 10 rotates in the same direction. Here, the elastic modulus in the direction of bending is smaller than the elastic modulus in the longitudinal direction R1. Thus, unlike conventional ones, the interference with the movement of the slider 10 by the optical waveguide 13 can be prevented, and it is difficult to have an influence on gimbal operations. Therefore, also from this point of view, the slider 10 can be levitated in a more stable manner, and the levitating attitude can be stabilized.

Because the basic waveguide section 20 of this embodiment in particular is placed on the top surface of the beam 11, the basic waveguide section 20 can bend like inflating without any interference even when the bent waveguide section 21 moves in the direction away from the disk D by following the movement of the slider 10. Furthermore, because the space E is provided between the part in a predetermined length on the bent waveguide section 21 side and the beam 11, the basic waveguide section 20 can bend without interfering with the beam 11 even when the bent waveguide section 21 moves in the direction closer to the disk D by following the movement of the slider 10.

In this way, because the basic waveguide section 20 has a high degree of freedom in the direction of bending, the influence on the gimbal operations can be significantly minimized. In a case where the slider 10 rotates about an axis that is parallel to the longitudinal direction R1 of the beam 11, it is difficult to influence on the gimbal operations only with the twist of the basic waveguide section 20.

As a result of them, the control over the levitation and the levitating attitude can be more stabilized than conventional ones, and information can be recorded/reproduced more accurately. Because the attitude of the levitating slider 10 is stable, the amount of levitation can be minimized as much as possible by bringing the slider 10 closer to the disk D more than conventional ones. Thus, information can be recorded at a higher density than conventional ones. Furthermore, because the slider 10 can be brought extremely closer to the gimbal means 12, the distance between the projection 16 and the center of gravity of the slider 10 can be shorter than conventional ones. Therefore, a moment of rotation is difficult to occur when the beam 11 is scanned. As a result, high-speed scanning can be performed, and the scanning performance can be enhanced.

Figure 7:
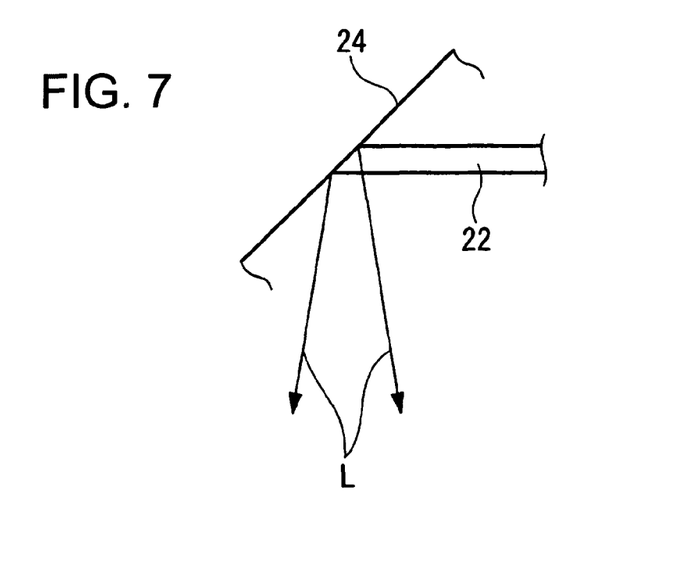
FIG. 7 is a diagram showing a relationship between a core and a mirror composing an optical waveguide.

Describing the guidance of a luminous flux L in detail here, in order to guide a luminous flux L to the slider 10, the luminous flux L is first launched to the core 22 provided within the basic waveguide section 20. Then, the luminous flux L travels within the core 22 toward the tip side of the basic waveguide section 20 by repeating the total reflection at the interface between the core 22 and the clad 23 due to the difference in index of refraction. The luminous flux L traveled to the tip of the waveguide section 20 is reflected by the mirror 24, and the angle changes, as shown in FIG. 7. Then, because the total reflection condition is not satisfied at the time of the reflection, the luminous flux L travels toward the bent waveguide section 21 side across the core 22. However, because the bent waveguide section 21 is composed of the clad 23 only, as shown in FIG. 4, the luminous flux L travels within the bent waveguide section 21 toward the slider 10 by gradually diffusing. Thus, the luminous flux L at a state of diffused light in a certain extent can be guided to the condenser lens 10b.

Hence, as shown in FIG. 4, the angle of condensation (point-ahead angle) θ in condensing the luminous flux L to the near-field light emitting device through the condenser lens 10b can be a high value as much as possible. In other words, the luminous flux L can be condensed at a steeper angle. Therefore, the NA can be increased. As a result, the near field light S can be generated more efficiently, and the performance of recording/reproduction can be enhanced, which can provide higher quality.

As described above, with the head gimbal mechanism 2 of this embodiment, the slider 10 can be levitated in a more stable manner than conventional ones, and information can be recorded/reproduced at a higher density and more accurately. Furthermore, the scanning performance can be enhanced by performing stable high-speed scanning.

With the information recording/reproducing apparatus 1 of this embodiment, because it includes the head gimbal mechanism 2 that can levitate the slider 10 in a more stable manner and minimize the amount of levitation as much as possible, information recording/reproduction can be performed accurately and at a higher density, which can provide higher quality. Furthermore, because the head gimbal mechanism 2 also has an enhanced scanning performance, the throughput can be enhanced.

The technical scope of the invention is not limited to the embodiment above, and various changes can be made thereto without departing from the spirit of the present invention.

For example, while the basic waveguide section 20 has an equal width from the base end side to the tip side of the beam 11 in the embodiment, the basic waveguide section 20 may be designed so as to more easily bend by changing the section area halfway along the surface that is orthogonal to the longitudinal direction R1 of the beam 11.

Figure 8:
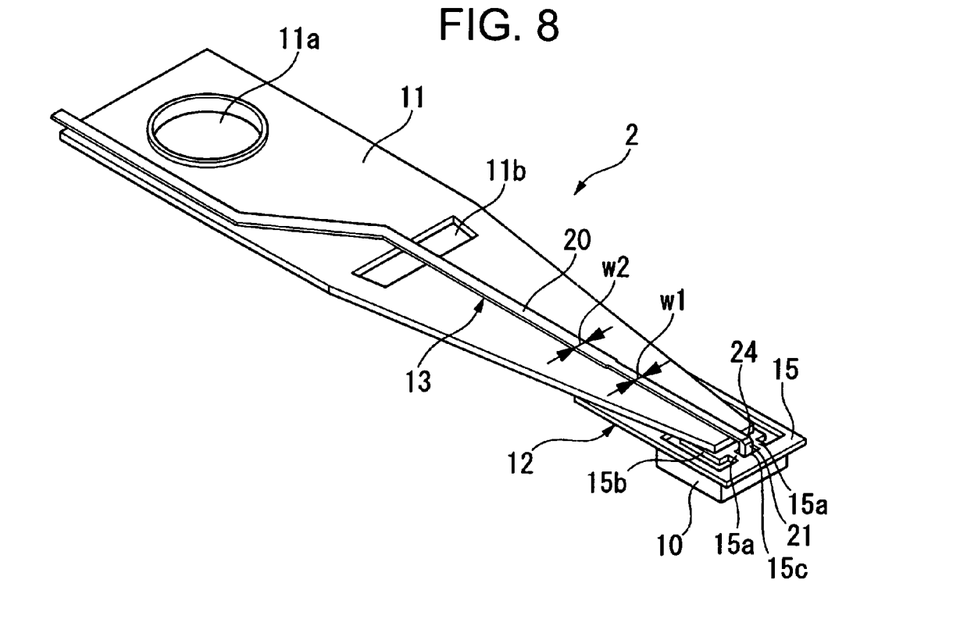
FIG. 8 is a perspective view showing a variation example of the head gimbal mechanism shown in FIG. 2.

For example, as shown in FIG. 8, the basic waveguide section 20 may be designed such that a width W1 on the tip side of the beam 11 can be narrower than another width W2. Because this can reduce the section area on the tip side of the beam 11, the basic waveguide section 20 can be more easily bend on the tip side. Therefore, the influence on the gimbal operations can be further reduced. As a result, the stability of the levitating slider 10 can be further increased.

Though the section area may be reduced by reducing the width as described above, the section area may be reduced by reducing the thickness.

Figure 9:
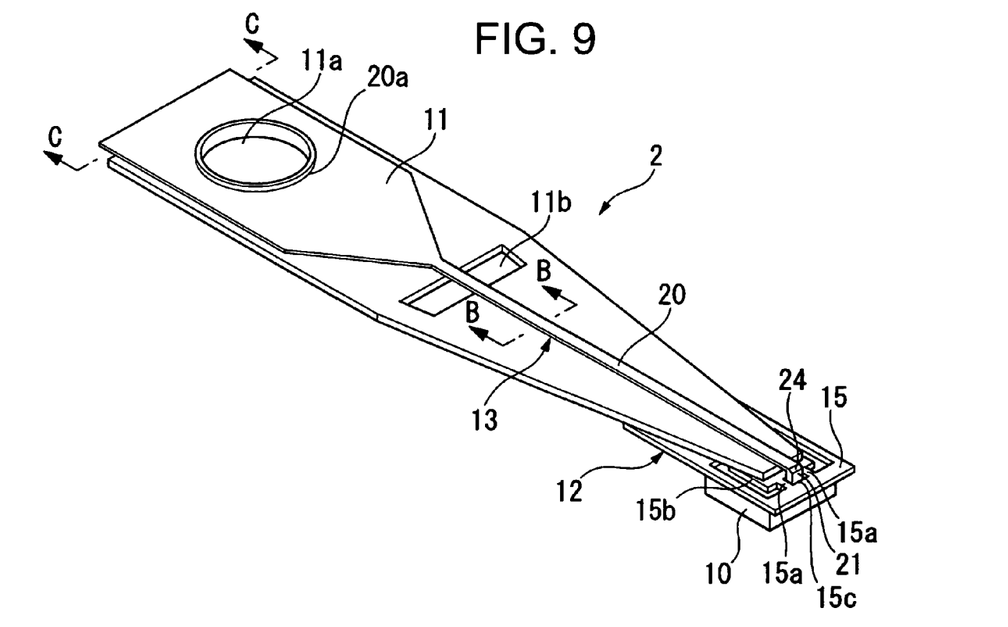
FIG. 9 is a perspective view showing another variation example of the head gimbal mechanism shown in FIG. 2.
Figure 10A:
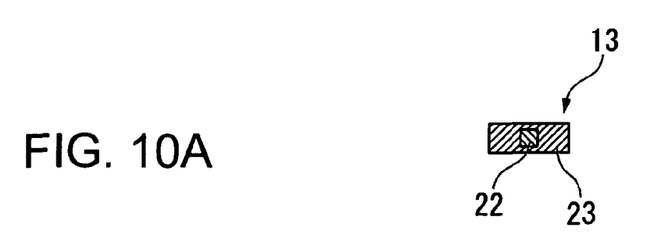
Figure 10B:
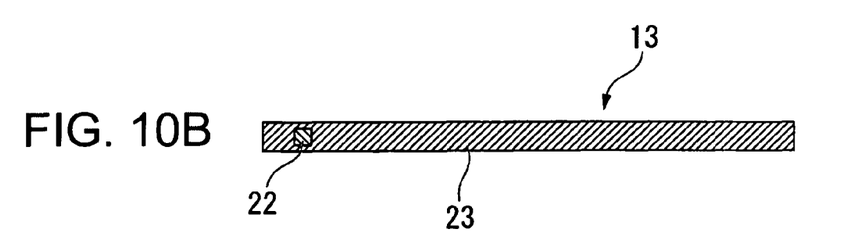

As shown in FIG. 9, the basic waveguide section 20 may be formed so as to have a substantially equal width as that of the beam 11 on the base end side of the beam 11. Preferably in this case, the base end side of the basic waveguide section 20 also has an aperture 20a in an equal size to that of the aperture 11a of the beam 11, and the aperture 20a is placed over the beam 11. As shown in FIGS. 10(a) and (b), the size and position of the core 22 are the same as those in the embodiment.

By forming the basic waveguide section 20 in that way, the contact area between the basic waveguide section 20 and the beam 11 can be increased. Therefore, because the optical waveguide 13 can be securely positioned and be fixed to the beam 11 in a stable manner, the misregistration of the optical waveguide 13 can be prevented, for example. As a result, the long-term reliability can be provided.

Figure 11:
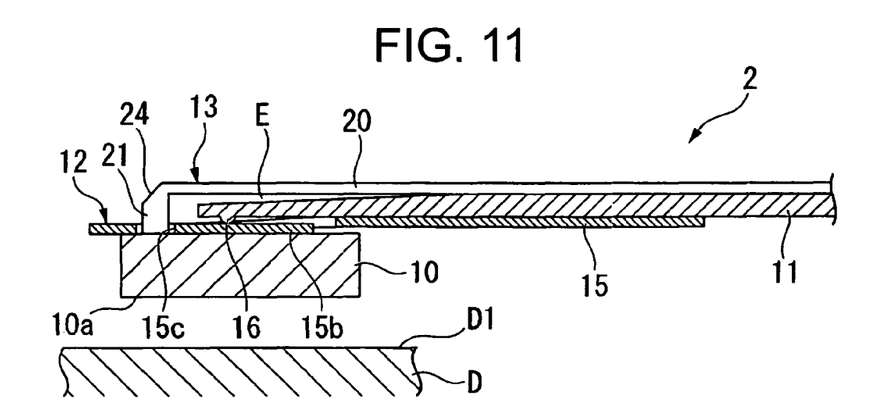
FIG. 11 is a section view showing another variation example of the head gimbal mechanism shown in FIG. 2.

While the space E is formed between the basic waveguide section 20 and the beam 11 by isolating the tip side of the basic waveguide section 20 from the beam 11 in the embodiment, it is not limited by the configuration. For example, as shown in FIG. 11, the beam 11 may be formed by cutting it diagonally such that it can be thinner as it goes to the tip. Thus, the space E can be formed between the basic waveguide section 20 and the beam 11 without isolating the tip side of the basic waveguide section 20. Also in this case, the same operational effect can be provided.

Configuring the basic waveguide section 20 to project sufficiently from the tip of the beam 11 can provide the same operational effect without providing the space E as described above. This is because the part of the basic waveguide section 20 sufficiently projecting from the tip of the beam 11 can easily bend vertically. In a case with the configuration, the basic waveguide section 20 can be designed to embed within the beam 11 instead of providing it on the top surface of the beam 11.

Figure 12:
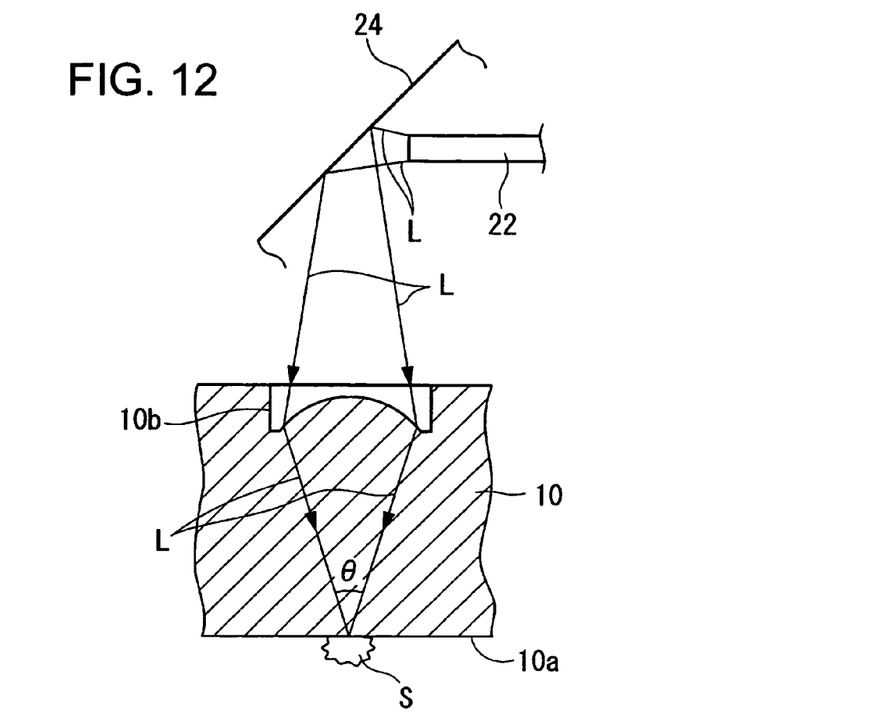
FIG. 12 is a relationship diagram of a core and a mirror composing an optical waveguide in a case where the core and the mirror are placed apart.

While it is configured such that the tip of the core 22 can be in contact with the mirror 24 in the embodiment, the core 22 may be positionally adjusted such that a predetermined space can be provided between the tip of the core 22 and the mirror 24, as shown in FIG. 12.

Thus, the luminous flux L guided by the core 22 can reach the mirror 24 after exiting from the tip of the core 22 once. The luminous flux L reflected by the mirror 24 diffuses and travels toward the bent waveguide section 21 side without across the core 22 and enters to the condenser lens 10b of the slider 10. In this way, because a space is provided between the tip of the core 22 and the mirror 24, the luminous flux L reflected by the mirror 24 does not cross over the core 22. Therefore, the reflected luminous flux L is not refracted by the core 22. As a result, the luminous flux L having a larger extent can be guided to the condenser lens 10b.

Hence, the angle of condensation (point-ahead angle) $\theta$ in condensing the luminous flux L to the near-field light emitting device through the condenser lens 10b can be a high value as much as possible, and the luminous flux L can be condensed at a steeper angle. Therefore, the NA can be increased. As a result, the near field lights can be generated more efficiently, and the performance of recording/reproduction can be enhanced, which can provide higher quality.

INDUSTRIAL APPLICABILITY

With the head gimbal mechanism according to the invention, the slider can be levitated in a more stable manner than conventional ones, and information can be recorded/reproduced at a higher density and more accurately. Furthermore, the scanning performance can be enhanced by performing stable high-speed scanning.

With the information recording/reproducing apparatus according to the invention, because it includes the head gimbal mechanism, information recording/reproduction can be performed accurately and at a higher density, which can provide higher quality. Furthermore, the throughput can be enhanced.

The invention claimed is:

1. A head gimbal mechanism causing information to be recorded/reproduced to/from the recording medium by using near-field light, the head gimbal mechanism characterized by comprising:
   a beam that has a planer shape and is movable in a parallel direction to a surface of the recoding medium;
   a slider placed between the recording medium and the beam and having an optical system condensing a guided luminous flux, a near-field light emitting device generating the near-field light from the condensed luminous flux and an air bearing surface facing the surface of the recording medium;
   gimbal means for fixing the slider to the bottom surface of the beam at a state that it rotates about two axes which are parallel to the surface of the recording medium and are orthogonal to each other; and
   a flexible optical waveguide composed of a basic waveguide section placed from the base end side to the tip side of the beam along the beam and a bent waveguide section that is bent in the direction substantially orthogonal to the surface of the recording medium from the tip of the basic waveguide and connecting to the slider in non-contact with the beam and the gimbal means, the optical waveguide guiding the luminous flux to the slider, wherein the basic waveguide section is placed at a state that at least a predetermined length on the bent waveguide section side relative to the beam is not fixed to the beam.

2. The head gimbal mechanism according to claim 1 characterized in that:

the basic waveguide section is placed on the top surface of the beam so as to face the slider across the beam, and the area excluding that of the predetermined length is fixed to the beam; and a space is provided in advance between the beam in the area of the predetermined length and the basic waveguide section.

3. The head gimbal mechanism according to claim 1, characterized in that:

the basic waveguide section is formed such that the section area along the surface that is orthogonal to the longitudinal direction of the beam can be smaller than section areas at other positions on the tip side of the beam.

4. The head gimbal mechanism according to claim 1 characterized in that the basic waveguide section is formed so as to have a substantially equal width as that of the beam on the base end side of the beam.

5. The head gimbal mechanism according to claim 1 characterized in that:

the basic waveguide section and the bent waveguide section are both formed from a clad;

a core that contains a material having a different index of refraction from that of the clad and guides the luminous flux under a total reflection condition is provided within the basic waveguide section; and a mirror that reflects the luminous flux guided by the core toward the optical system through the bent waveguide section is provided between the basic waveguide section and the bent waveguide section.

6. The head gimbal mechanism according to claim 5 characterized in that the core is positionally adjusted such that a predetermined space can be provided between its tip and the mirror.

* * * * *